United States Patent [19]

Buisson et al.

[11] Patent Number: 5,426,982
[45] Date of Patent: Jun. 27, 1995

[54] PROCESS AND DEVICE FOR CONTROLLING A FLOW OF PARTICLES IN A PIPE

[75] Inventors: André Buisson, Tassin La Demi Lune; Claude Beauducel, Henonville; Damien Gille, Vienne, all of France

[73] Assignee: Institut Francais du Petrole, France

[21] Appl. No.: 166,966

[22] Filed: Dec. 15, 1993

[30] Foreign Application Priority Data

Dec. 15, 1992 [FR] France .................. 92 15114

[51] Int. Cl.⁶ ................................. G01F 1/74
[52] U.S. Cl. ................................. 73/861.04
[58] Field of Search ........... 73/215, 861.52, 861.04, 73/861.42, 861

[56] References Cited

U.S. PATENT DOCUMENTS 4,930,343  6/1990  Johnson .............. 73/861.52
5,199,306  4/1993  Hunter ................ 73/215

FOREIGN PATENT DOCUMENTS 338810  9/1989  Austria .
2530015  1/1984  France .

OTHER PUBLICATIONS

Soviet Inventions Illustrated, Section EI, Week 84/17, Jun. 6, 1984, Derwent Publications Ltd. AN 84-1064-37—Abstract.

Primary Examiner—Richard E. Chilcot, Jr.
Assistant Examiner—Harshad Patel
Attorney, Agent, or Firm—Antonelli, Terry, Stout & Kraus

[57] ABSTRACT

In order to measure for example the velocity of particles moving within various pipes or enclosures (1), such as catalyst balls circulating in continuous reforming plants, a channel (2) with a section suited to that of the particles, connected to a source of fluid of determined flow rate (4), opens therein and the pressure variations in this channel, resulting from the flow of the particles circulating past the end thereof, which modify the free flowing of the fluid towards the pipe, are measured. The particle velocity is notably determined through an autocorrelation of the signal translating the pressure variations by means of a processing system (6). Two fluid-fed channels (7, 8) may also open onto two different locations along the pipe and, through a crosscorrelation of the signals translating respectively the pressure variations, the velocity and the section of the circulating particles may for example be determined.

17 Claims, 3 Drawing Sheets

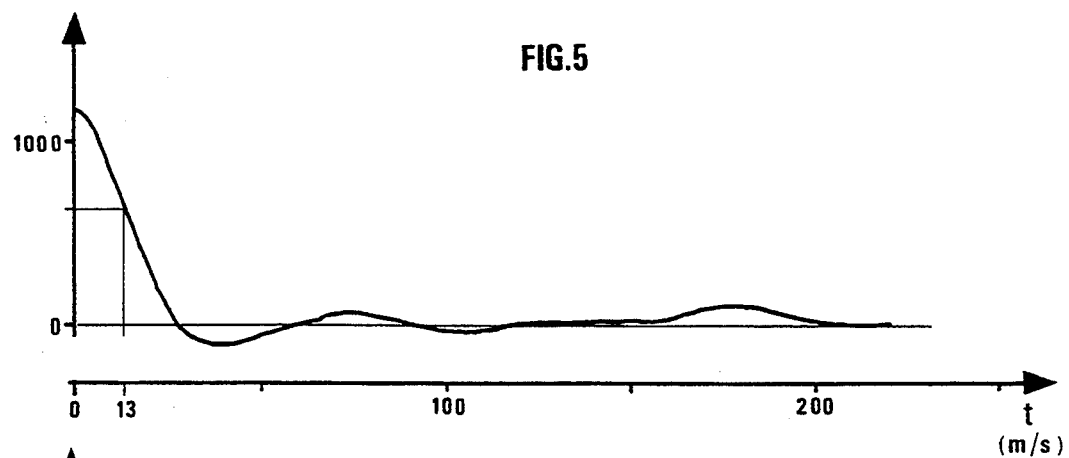
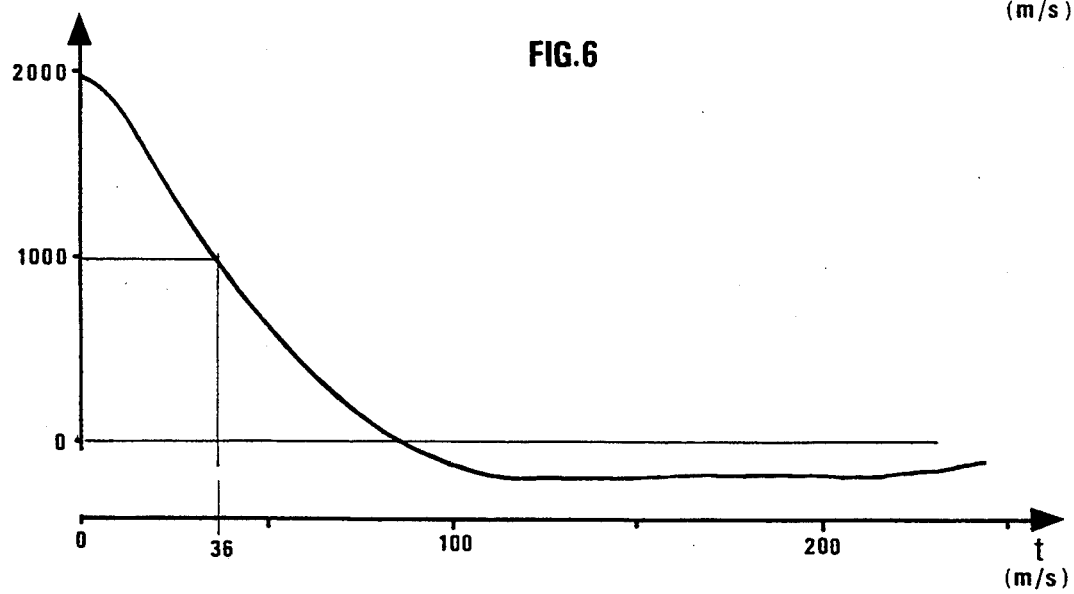
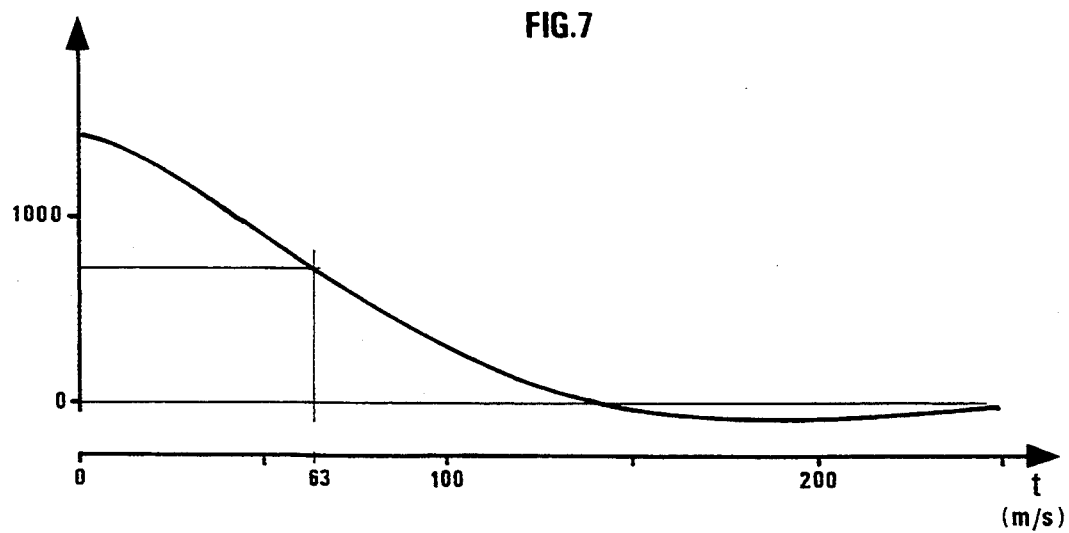

PROCESS AND DEVICE FOR CONTROLLING A FLOW OF PARTICLES IN A PIPE

FIELD OF THE INVENTION

The object of the present invention is to provide a process and a device for determining the characteristics of particles moving in a pipe. The process according to the invention is particularly suited for measuring the velocity and/or the section of particles or pellets moving continuously or discontinuously in a pipe.

In the following text, "pipe" is a generic term referring to any type of conduit, enclosure, vessel, reactor, etc, in which particles circulate.

BACKGROUND OF THE INVENTION

The invention may notably be applied to the continuous reforming field where a catalyst having the shape of pellets of substantially equal diameter runs through a chain of reactors arranged vertically. At the base of each one of them, the reactors enter a transfer element known as a "lift pot", where they are mixed with a gas under pressure generated during the process and blown through a tube towards an upper inlet of the next reactor. At the end of this chain, the catalyst pellets are directed by a gas stream towards a regenerator and, once regenerated, they are moved again along the chain of reactors. Such a continuous reforming process is for example described in U.S. Pat. No. 4,172,027 filed by the applicant.

During these continuous reforming cycles, a degradation of the catalyst generally occurs along the circuit followed by a phenomenon known as an "attrition". The catalyst is translated into dust depositions on the grates inside the reactors and notably a change in the circulation of the catalyst particles occurs in the pipe connecting the base of each reactor to the blow transfer element. Since these elements work properly only within a narrow range, the flow of blow gas has to be carefully controlled to be proportional to the flow of particles to be transferred. It is useful to control the circulation of the pellets by measuring for example the displacement velocity thereof.

The measurement of parameters relative to the circulation of particles in a pipe may be achieved according to several different techniques.

An acoustic type technique for measuring the displacement velocity of solid particles in a fluid current is used in the coal mining industry. It consists of arranging two pairs of ultrasound transceivers in two different places along a pipe and correlating the signals received respectively by the receivers in response to impulses transmitted by the corresponding transmitters. An example of this technique is described for example in U.S. Pat. No. 4,598,593.

A different technique, also used in the coal mining industry is described for example in U.S. Pat. No. 4,506,541, which allows the density of the particles circulating in pipes to be measured. It mainly consists in transmitting through the pipe an electron beam by means of an isotopic source and measuring, by means of a sensor the energy diffracted by the particles.

Another well-known technique for measuring the velocity of circulating particles such as blood cells is for example described in U.S. Pat. No. 4,596,254. It mainly consists in measuring the frequency shift due to the Doppler effect which affects light waves which have run through the flow of particles and determining the velocity thereof by autocorrelation.

SUMMARY OF THE INVENTION

The object of the invention is to monitor a flow of particles circulating in a pipe. It comprises:

injecting a fluid, at a determined flow rate, into at least one tube opening into the pipe through a port, the section of the tube at least at the opening of the port having a section dimensioned with reference to dimensions of the circulating particles and measuring signals representative of the pressure variations of the fluid in the tube or between the tube and the pipe. These variations result from the flow of the particles running past the port of the tube to determine at least one significant parameter therefrom.

The process comprises for example measuring the signals to determine the presence of particles circulating in the pipe.

It may further comprise processing the signals by correlation.

In case the sections (dimensions) of the particles circulating in the pipe are close to each other, the processing of the signals representative of the pressure variations comprises an autocorrelation of the signals, to determine therefrom the velocity of flow of the particles running past the port.

According to another embodiment, the process comprises, injecting a fluid at a determined flow rate into two tubes opening into the pipe through two ports located at two separate interior places along the piper with the section of each tube in front of the port has a section having dimensions close to the dimensions of the circulating particles.

measuring separately the signals representative of the variations of the fluid pressure in each tube resulting from the flow of the particles circulating past the ports; and correlating the signals corresponding respectively to the two tubes, to determine the velocity and the section of the particles.

The process according to the invention is particularly useful for controlling the flow of particles notably in numerous chemical industrial units where adverse environments are often treated under highly variable temperature and pressure conditions. One or several stainless steel tubes fed with a fluid which is generally the same as the fluid circulating in the chemical unit concerned, are associated with absolute or differential pressure measuring means, which are sufficient to generate signals useful for monitoring a flow of particles and for determining some of the characteristics thereof. The cost of such a device is relatively low.

The device according to the invention allows a flow of particles circulating in a pipe to be controlled. It includes at least one tube opening into the pipe through a port, the section of the tube at least at the opening of the port having a section related to that of the circulating particles, at least one source of fluid at a determined flow rate communicating with the tube and means for measuring pressure variations in the tube, gene, rated by the flow of particles circulating past the port thereof.

The device further includes for example processing means for determining by correlation at least one parameter indicative of the particles circulation.

When the particles have substantially the same section, the processing means autocorrelates the signals to determine therefrom the flow velocity of the particles circulating past the port.

According to another embodiment, the device includes two tubes opening into the pipe through two ports at two separated interior places along the pipe with the section of each tube at least in front of the port thereof having a section of the same order of magnitude as that of the circulating particles; two sources of fluid of determined flow rate supplying respectively the two tubes; means for measuring separately signals representative of the variations of the fluid pressure in each tube, resulting from the flow of the particles in the pipe past the respective ports of the two tubes; and means for comparing the signals corresponding respectively to the two tubes.

The comparison means are for example adapted for achieving a correlation of the signals corresponding respectively to the two tubes so as to determine the velocity and the section of the circulating particles.

BRIEF DESCRIPTION OF THE DRAWINGS

Other features and advantages of the process and of the device according to the invention will be clear from reading the description hereafter of embodiments given by way of non limitative examples, with reference to the accompanying drawings in which:

FIGS. 5 to 7 show several autocorrelation curves obtained from variation curves.

DESCRIPTION OF THE PREFERRED EMBODIMENTS

Figure 1:
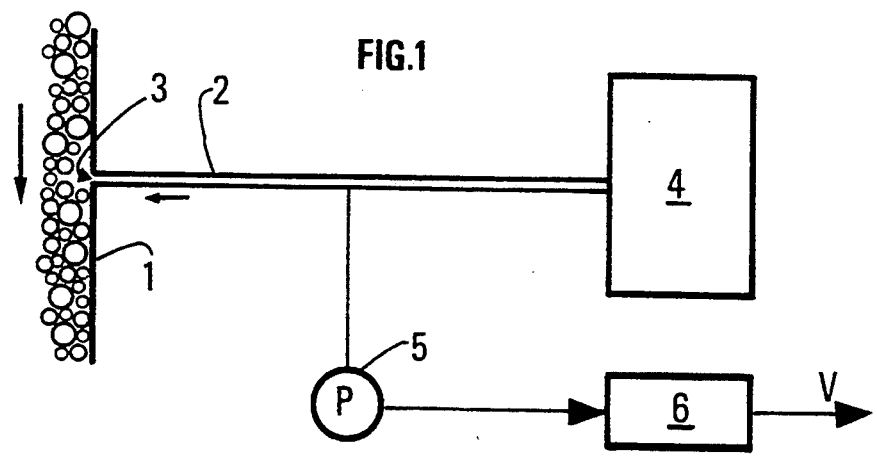
FIG. 1 shows a first embodiment of the device according to the invention with a single injection tube.

The process according to the invention mainly consists of measuring the pressure variations of a fluid such as a gas, generated by particles in motion hindering the free flow of this gas. The particles whose velocity is to be measured for example move in a pipe 1 (FIG. 1, 2). They may for example be balls or pellets used as a support for a catalyst and which move under the effect of gravity in a pipe connecting several chemical reactors, or in any enclosure.

According to the first embodiment (FIG. 1), the device includes a tube 2 opening into pipe 1 at a first end through a port 3. Preferably, tube 2 is flush with the interior wall of pipe 1 in order not to disturb the flow of the particles. This tube 2 is fed with fluid under pressure at the opposite end thereof by a source of fluid 4 at a determined and preferably constant flow rate. A pressure detector 5 is arranged to measure permanently the pressure of the fluid circulating in tube 2. It generates a signal indicative of the pressure measured, which is applied to a computer 6 such as a programmable microcomputer of a well-known type provided with an interface card for the acquisition of the pressure measuring signals.

The section of tube 2 is selected to be of the same order of magnitude as the section of the particles circulating in the pipe and preferably smaller so as to produce clear-cut variations in the pressure of the fluid. A tube having a section ranging between $\frac{1}{3}$ and 1/10 of a section of the particles is for example used.

Figure 4:
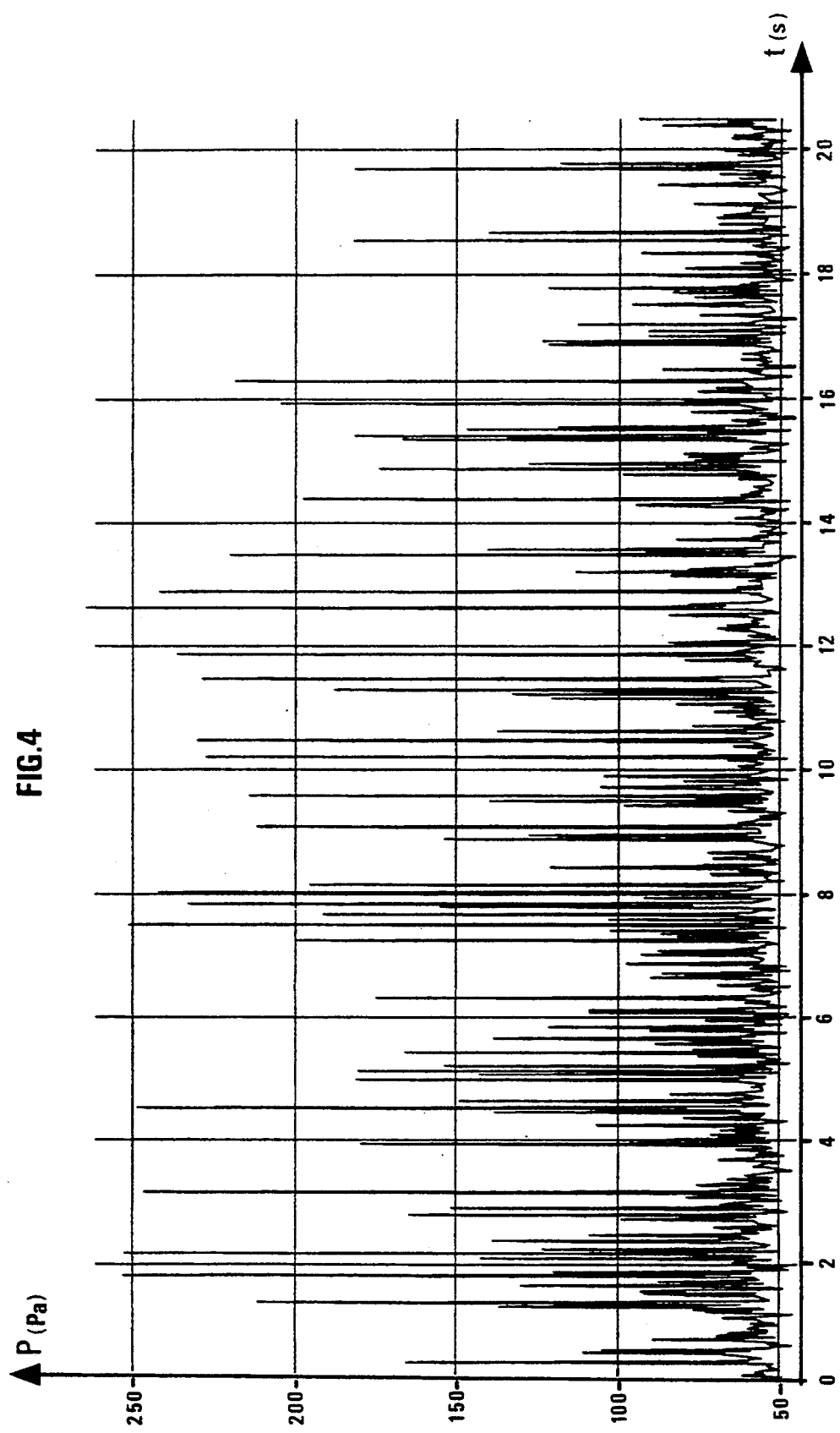
FIG. 4 shows an example of a trace representative of the pressure variations due to the flow of particles, which may be obtained with the device according to the invention.

The particles moving in pipe 1 and past port 3 modify the instantaneous pressure measured by detector 5. The measured pressure (FIG. 4) shows peaks whose amplitude depends on the proximity of the balls with respect to the port. The width of the peaks is proportional to D/V where D is the section of the particles and V the average velocity thereof.

In case the particles circulating in pipe 1 have substantially the same section D, the process according to the invention allows the flow rate to be determined by achieving an autocorrelation of the function P(t) and by measuring the width at half height, expressed in time, of the main peak of the correlation obtained.

It has been experimentally established that the width (in time) of the main peak of the autocorrelation function at half height is inversely proportional to the velocity of the particles, as substantially shown by the experimental curves of FIGS. 5 to 7. They have been established by autocorrelating pressure variations measured in tube 2 when particles of a known section and exhibiting velocities V1, V2, V3 of respectively $3.846 \times 10^{-2}$ m/s, $1.44 \times 10^{-2}$ m/s and $0.847 \times 10^{-2}$ m/s are passed before the outlet port 3 thereof. It is checked that, in the three experimental cases, the product of the measured time dt1, dt2, dt3 of each main peak (respectively 13 ms, 36 ms and 63 ms) by the corresponding velocity substantially equals, in any case, a factor k of the order of 0.5. From this common value of factor k established through a preliminary calibration, it is possible to determine, by measuring the width at half height of each peak, the average velocity of the particles for a determined pressure measuring time interval.

Figure 2:
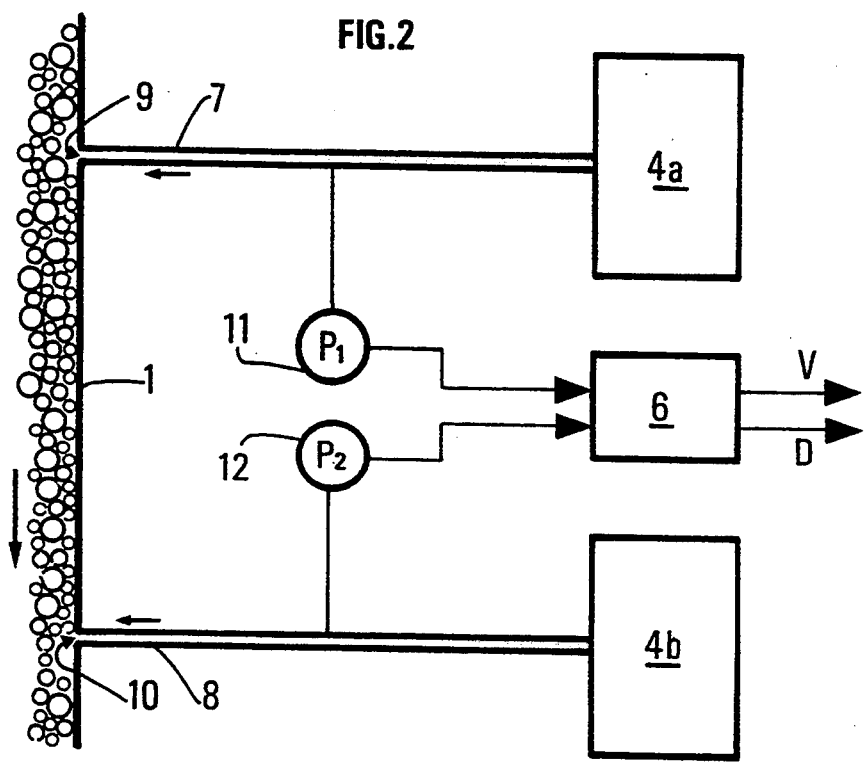
FIG. 2 shows a second embodiment of the invention with two injection tubes.

According to the embodiment of FIG. 2, the device includes two thin tubes 7, 8 one first end of which opens into pipe 1 through two ports, respectively 9, 10, separated from each other. Similarly, these two tubes are fed with fluid each by two distinct sources (4A, 4B) at a determined and preferably constant flow rate. Two pressure detectors 11, 12 measure the pressure variations respectively in the two tubes 7, 8 generated by the particles running respectively past ports 9, 10. The signals produced by the two detectors are acquired in parallel by computer 6 by means of a multiplexer (not shown).

Figure 3:
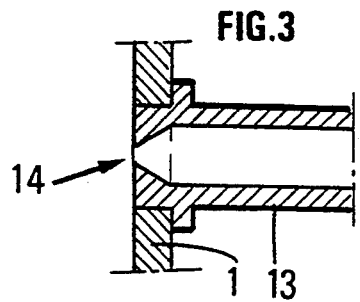
FIG. 3 shows an embodiment of the fluid injection tubes.

Tubes 2, 7, 8 of constant section proportional to the section of the particles may be replaced in practice (FIG. 3) by tubes 13 of a larger section ended by a nozzle 14 and opening into pipe 1 through a port whose section is adapted, as previously, to that of the particles.

With the lay-out described, the process according to the invention allows two different parameters to be determined through the intercorrelation of the functions P1(t) and P2(t) representative of the respective pressure variations in the thin tubes 7, 8. It may be seen that the intercorrelation function shows a main peak exhibiting a time lagt with respect to the origin of time, which is equal to the time taken by the particles to cover the distance between the two ports 9, 10. Knowing the distance between the two ports 9, 10, the measurement of this time interval t allows the first parameter, i.e. the average velocity of the particles during the interval time of acquisition of traces P1(t) and P2(t), to be determined. The average velocity V of the particles being known by measuring the time lag t, the measurement of the width of the main peak of the intercorrelation function allows the section D of the particles circulating in pipe 1 to be determined therefrom.

Without departing from the scope of the invention, each source of fluid of determined flow rate may be replaced by means for delivering a fluid at a substantially constant pressure and the fluid flow variations in each thin tube, resulting from the flow of the particles past their port 3, 9, 10, may be measured. These means for supplying a fluid of constant pressure may be in this case, for example, a high-pressure tank connected to each tube through a pressure reducer controlling the pressure downstream. However, this alternative process is more difficult to implement in practice.

We claim:

1. A process for monitoring a flow of particles circulating in a pipe comprising:
    injecting a fluid of a predetermined flow rate into at least one tube having said at least one tube opening into the pipe through an associated opening port with a cross-section of said at least one tube at the associated opening port and dimensions of the particles circulating in the pipe being of a same order of magnitude;
    measuring variations of pressure over time in the fluid flow with said variations of pressure in the fluid flow resulting from the particles circulating in the pipe flowing in front of each opening port; and
    processing signals representing the pressure variations to obtain at least one parameter of the flow of the particles.

2. A process in accordance with claim 1 wherein:
    the pressure variations are pressure variations of the fluid in said at least one tube.

3. A process in accordance with claim 2 further comprising:
    processing the signals representing the pressure variations to determine a presence of particles in the pipe.

4. A process in accordance with claim 2, wherein:
    the particles circulating in the pipe have substantially identical dimensions; and
    processing the signals representing the pressure variations includes autocorrelating the signals to obtain a velocity of the particles at each opening port.

5. A process in accordance with claim 2 further comprising:
    injecting a fluid at a predetermined flow rate into a first tube and a second tube which open into the pipe respectively through a first opening port and a second opening port at two spaced apart interior locations of the pipe with a cross section of the first and second tubes at the first and second opening ports and dimensions of the particles circulating in the pipe being of a same order of magnitude;
    measuring separately variations of pressure in the fluid flow rate over time with the variations of pressure in the fluid flow resulting from the particles circulating in the pipe passing in front of the first and second opening ports; and
    cross correlating signals corresponding respectively to the pressure variations in the first and second tubes to determine velocity and dimensions of the particles.

6. A process in accordance with claim 1 wherein:
    the pressure variations are detected by measuring a pressure difference between the tube and the pipe.

7. A process in accordance with claim 6 further comprising:
    processing the signals representing the pressure variations to determine a presence of particles in the pipe.

8. A process in accordance with claim 6, wherein:
    the particles circulating in the pipe have substantially identical dimensions; and
    processing the signals representing the pressure variations includes autocorrelating the signals to obtain a velocity of the particles at each opening port.

9. A process in accordance with claim 6 further comprising:
    injecting a fluid at a predetermined flow rate into a first tube and a second tube which open into the pipe respectively through a first opening port and a second opening port at two spaced apart interior locations of the pipe with a cross section of the first and second tubes at the first and second opening ports and dimensions of the particles circulating in the pipe being of a same order of magnitude;
    measuring separately variations of pressure in the fluid flow rate over time with the variations of pressure in the fluid flow resulting from the particles circulating in the pipe passing in front of the first and second opening ports; and
    cross correlating signals corresponding respectively to the pressure variations in the first and second tubes to determine velocity and dimensions of the particles.

10. A process in accordance with claim 1 further comprising:
    processing the signals representing the pressure variations to determine a presence of particles in the pipe.

11. A process in accordance with claim 1, wherein:
    the particles circulating in the pipe have substantially identical dimensions; and
    processing the signals representing the pressure variations includes autocorrelating the signals to obtain a velocity of the particles at each opening port.

12. A process in accordance with claim 1 further comprising:
    injecting a fluid at a predetermined flow rate into a first tube and a second tube which open into the pipe respectively through a first opening port and a second opening port at two spaced apart interior locations of the pipe with a cross section of the first and second tubes at the first and second opening ports and dimensions of the particles circulating in the pipe being of a same order of magnitude;
    measuring separately variations of pressure in the fluid flow rate over time with the variations of pressure in the fluid flow resulting from the particles circulating in the pipe passing in front of the first and second opening ports; and
    cross correlating signals corresponding respectively to the pressure variations in the first and second tubes to determine velocity and dimensions of the particles.

13. A device for monitoring a flow of particles circulating in a pipe comprising:
    at least one tube having said at least one tube opening into the pipe through an associated opening port having a cross section of said at least one tube at the associated opening port and dimensions of the particles circulating in the pipe being of a same order of magnitude;
    at least one fluid source feeding said at least one tube with a fluid at a predetermined flow rate;

at least one pressure sensor for sensing variations in said at least one tube resulting from the particles circulating in the pipe flowing in front of the associated opening port of said at least one tube; and a processor for obtaining at least one parameter of the flow of the particles by processing signals representing the pressure variations sensed by the at least one sensor.

14. A device in accordance with claim 13 wherein:

the processor determines by correlation of the signals representing the pressure variations at least one parameter representative of the circulation of the particles.

15. A device in accordance with claim 14 further comprising:

a first tube and a second tube which open into the pipe respectively through first and second spaced apart interior locations of the pipe with a cross section of the first and second tubes at the first and second opening ports and dimensions of the particles circulating in the pipe being of a same order of magnitude;

a fluid source for respectively feeding the first and second tubes with the fluid at a predetermined flow rate;

a pressure sensor for measuring pressure variations respectively in the first and second tubes resulting from the particles flowing in front of the first and second opening ports; and a processor for comparing signals representing the pressure variations in the first and second tubes.

16. A device in accordance with claim 15 wherein:

the processor correlates the signals corresponding respectively to the first and second tubes to determine a velocity and dimensions of the flowing particles.

17. A device in accordance with claim 13 wherein:

the particles circulating in the pipe have substantially identical dimensions and the processor autocorrelates the signals representing the pressure variations to obtain a velocity of the particles at the associated opening port of said at least one tube.

* * * * *